United States Patent [19]

Hughes

[11] Patent Number: 4,627,808

[45] Date of Patent: Dec. 9, 1986

[54] APPARATUS FOR MAKING CAPSULE HAVING PLURAL CHAMBERS

[76] Inventor: Raymond J. Hughes, P.O. Box 801, Mantoloking, N.J. 08738

[21] Appl. No.: 739,624

[22] Filed: May 31, 1985

[51] Int. Cl.⁴ .................. B29C 41/02; B29C 41/14; B29C 41/40

[52] U.S. Cl. ............................. 425/270; 264/305; 425/274; 425/275

[58] Field of Search .................. 425/269–275; 264/299, 304, 305

[56] References Cited

U.S. PATENT DOCUMENTS

| Re. 30,654 | 6/1981 | Dittmann et al. | 425/274 |
|---|---|---|---|
| 2,568,128 | 9/1951 | Morris | 425/269 |
| 2,975,477 | 3/1961 | Hostetler | 425/270 |
| 3,794,453 | 2/1974 | Padilla et al. | 425/270 |
| 3,870,450 | 3/1975 | Graebe | 425/269 |
| 4,521,365 | 6/1985 | Kurtz | 425/269 |

OTHER PUBLICATIONS

The United States Pharmacopeia XX, pp. 1017, 1020, 1021, 1022, 1023, 1024 Federal Food, Drug, and Cosmetic Act, Sec. 201 (21 U.S.C. 321).

Poison Prevention Packaging Act, Secs. 2, 3, 4, and Regulations.

Primary Examiner—Willard E. Hoag

[57] ABSTRACT

A hard capsule making apparatus consisting of cleft dipping pins, encircling stripping rings, and rotation discs having parallel grooved retainer bars, to provide a means for making and stripping novel integrally formed multiple chamber hard capsules, and a means for making and stripping novel multiple chamber hard capsules made by combining separate hard capsules of different sizes to form a single unit, fixed capsule within a capsule vehicle. The multiple chamber capsules are made of methylcellulose, gel, or other appropriate material, providing a clear, transparent, or translucent exterior wall of the body part of the multiple chamber capsule, thus providing an externally visible means for the consumer or user to detect, before use, whether the capsule has been opened after original filling and closure, by means of contrasting visible evidence of reopening, in the form of changed physical appearance of an original substance, or a substituted substance contained in at least one chamber thereof.

7 Claims, 17 Drawing Figures

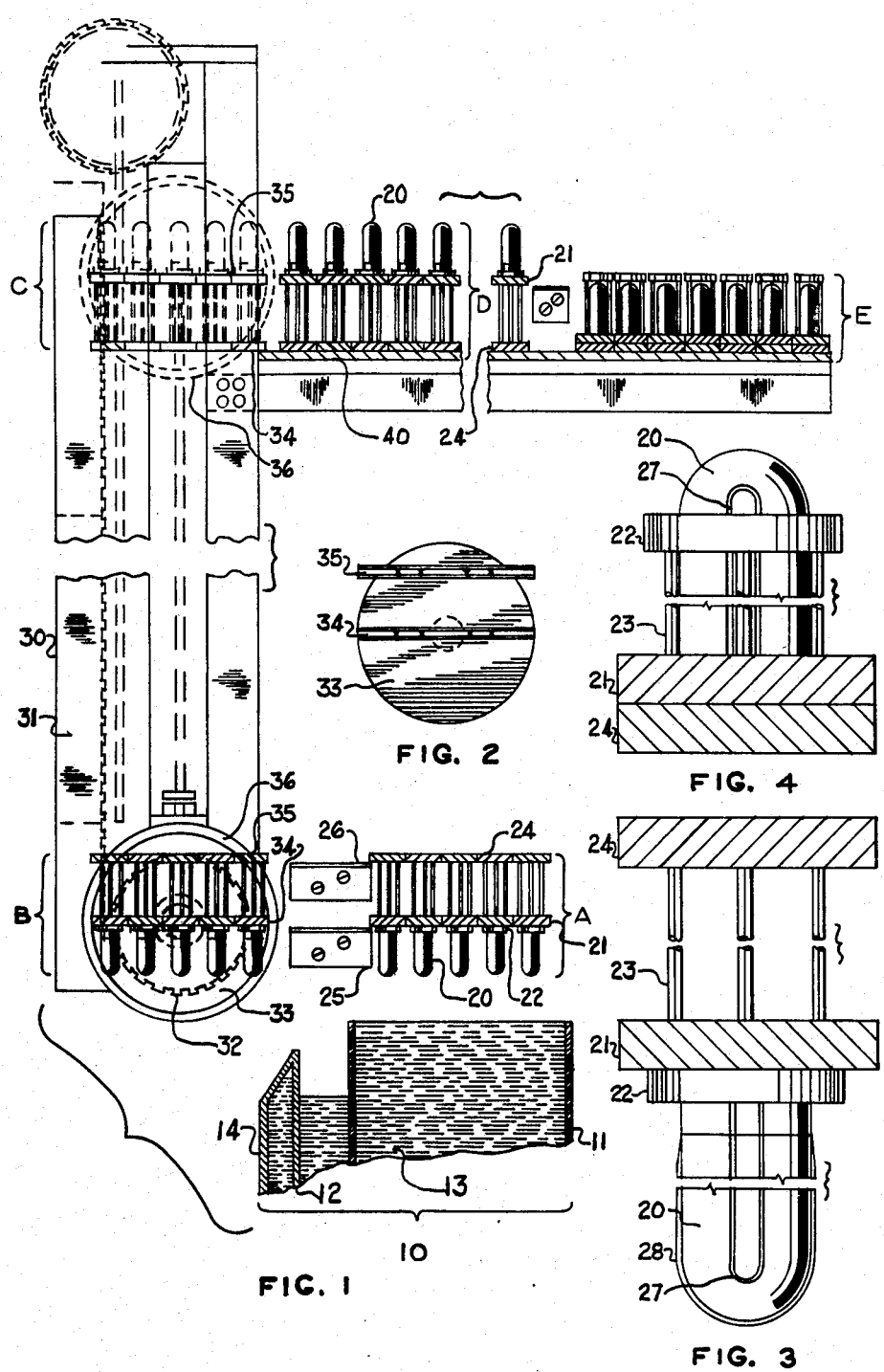

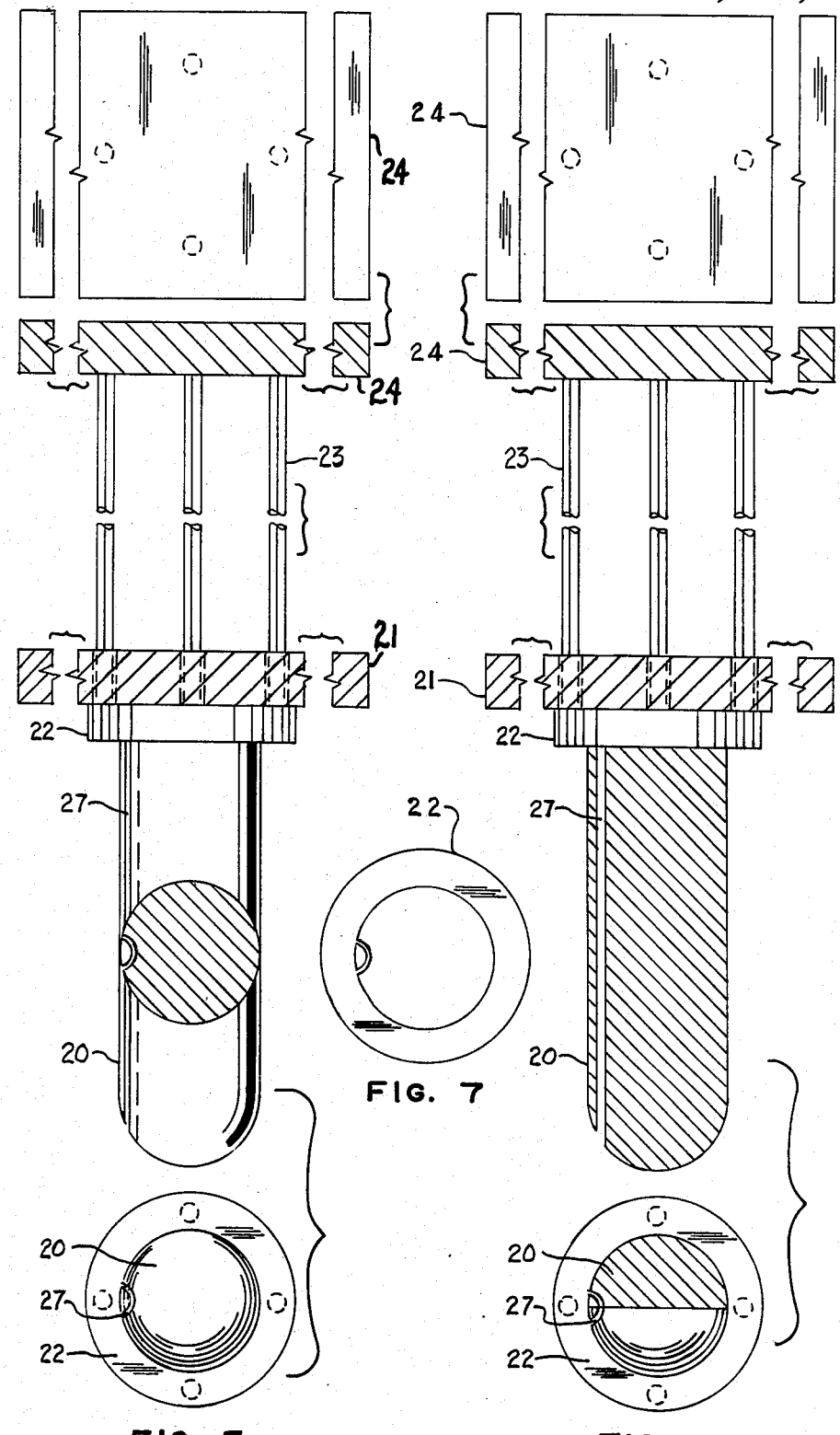

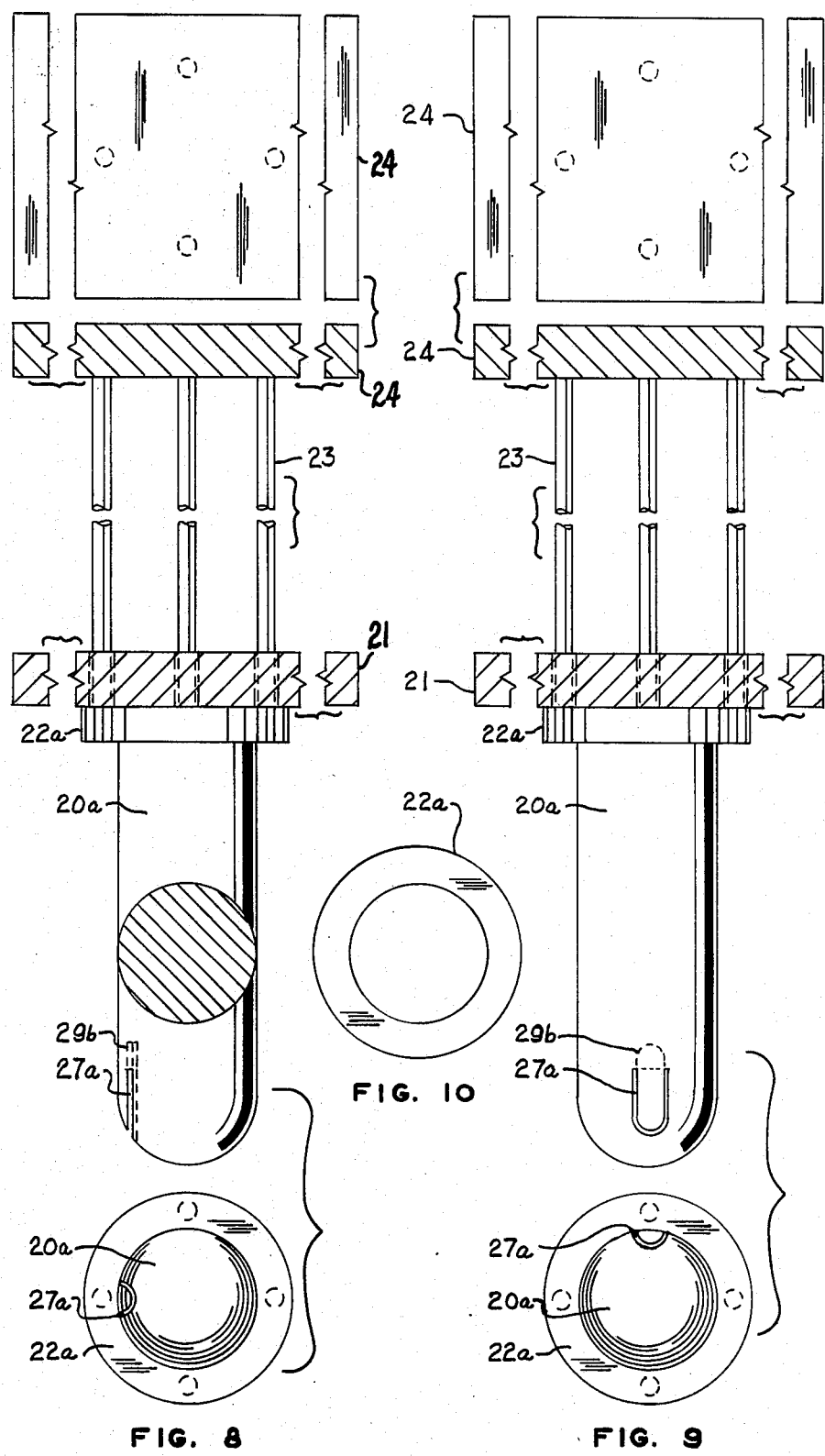

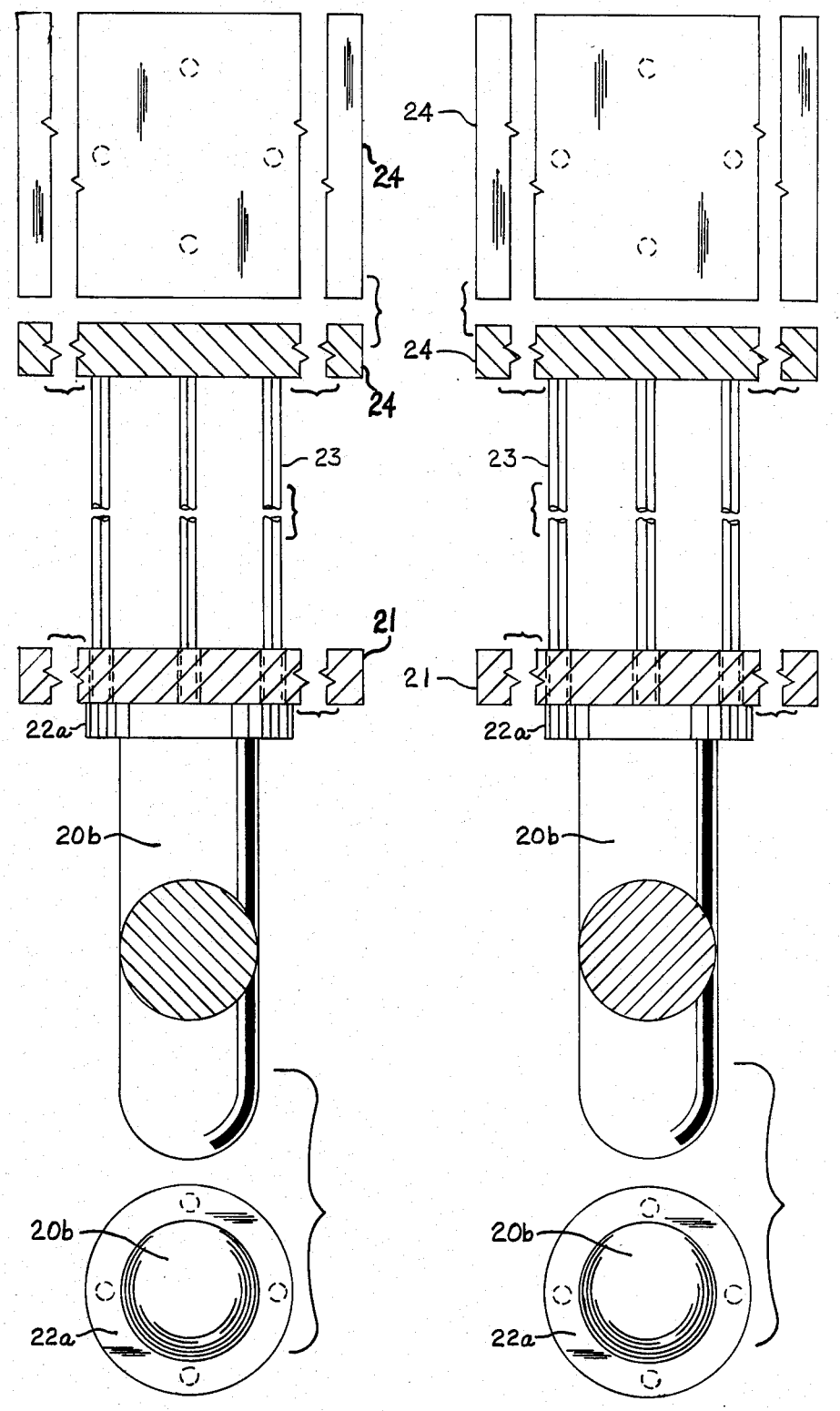

APPARATUS FOR MAKING CAPSULE HAVING PLURAL CHAMBERS

FIELD OF INVENTION

This invention relates to apparatus for making hard cap and body type capsules, and more particularly to apparatus for making novel integrally formed multiple chamber capsules.

DISCUSSION OF PRIOR ART

Heretofore, apparatus for making hard cap and body type capsules provided means for making capsules, each having only a single chamber to contain a pharmaceutical, dietary, or nutritional substance or pharmaceutical device for human or other animal consumption or use. The single chamber capsules have not provided a readily apparent, externally visible means for the consumer or user to detect whether, after it has once been filled and closed, an ingestible hard capsule subsequently has been opened and totally or partially refilled with any material, substance, or device.

OBJECTS

Accordingly, it is an object of my invention to provide a means for making novel integrally formed multiple chamber capsules, each capsule having more than one chamber, to contain in at least one chamber any desired quantity of pharmaceutical, dietary, or nutritional substance or unit of device for human or other animal consumption or use, and to contain in at least one other chamber of sufficient size and of equal or lesser capacity, and of suitable configuration, an appropriate quantity of other bland, inert, or otherwise innocuous ingestible substance of a distinctive color, multicolor, or varicolor, which constrasts in appearance with the pharmaceutical, dietary, or nutritional substance or unit of device so contained, and which may be of any appropriate composition, consistency, and degree of glissance and which is externally visible to the consumer or user before use, through the clear, transparent, or translucent wall of the body or base part of the capsule.

It is also an object of my invention to provide a vehicle which is an immediate package for dispensing and administering any pharmaceutical, dietary, or nutritional substance or pharmaceutical device, which vehicle meets certain definitions and standards as set forth in the unified United States Pharmacopeia XX and National Formulary XV. The unified United States Pharmacopeia XX and National Formularly XV are recognized as official compendia in numerous statutes, among which are the federal Food, Drug, and Cosmetic Act and the Poison Prevention Packaging Act, and which include certain standards and requirements of the federal Consumer Product Safety Commission. These statutes and their regulations include such definitions and standards by reference. Specifically, certain definitions excerpted from the Poison Prevention Packaging Act which, among others, are met by my invention, are as follows:

"Sec. 2. For the purpose of this Act-

"(2) The term "household substance" means any substance which is customarily produced or distributed for sale for consumption or use, or customarily stored, by individuals in or about the household and which is -

"(c) a food, drug, or cosmetic as those terms are defined in section 201 of the Federal Food, Drug, and Cosmetic Act (21 U.S.C. 321);

"(3) The term "package" means the immediate container or wrapping in which any household substance is contained for consumption, use, or storage by individuals in or about the household, . . . "

Safety standards and other consumer directed considerations and objectives which, among others, are met by my invention are as follows:

"Although special packaging should not be difficult for normal adults to open, it is recognized that some individuals having physical limitations, e.g., some elderly persons or arthritics, may have difficulties." (USP XX-P.1020).

"Stability considerations should include not only the specific compendial requirements, but also changes in physical appearance of the product that would warn users of the product that its continued integrity is questionable." (USP XX-P.1023).

"The stability parameters of a drug dosage form can be influenced by environmental conditions of storage ( . . . ), as well as the package components." (USP XX-P.1023).

". . . it is recognized that control beyond the dispenser or seller is difficult." (USP XX-P.1023).

It is a further object of my invention to provide a vehicle which is a means to dispense and administer simultaneously in a single unit vehicle any desired quantities of different pharmaceutical, dietary, or nutritional or other appropriate substances and pharmaceutical devices, to meet a requirement wherein two mutually incompatible drugs or other substances or devices are prescribed or dispensed and administered together.

Further objects and advantages of my invention will become apparent from a consideration of the drawings and ensuing description thereof.

DRAWINGS

In the drawings:

FIG. 1 is an elevational view partly in section of multiple chamber capsule making and stripping apparatus including a dipping tank, elevator, and loading and unloading system;

FIG. 2 is a view of a disc having dual parallel surface mounted grooved retainer bars;

FIGS. 3 and 4 are fragmented enlarged views of coated and stripped multiple chamber cleft body dipping pins with stripping rings in the pin down and pin up positions, respectively;

FIGS. 5 and 6 are side and longitudinal sectional views of the multiple chamber capsule body cleft dipping pin and stripping ring, respectively;

FIGS. 7 and 10 are plan views of the cap and body cleft dipping pin stripping rings, respectively;

FIGS. 8 and 9 are side and front views of the multiple chamber capsule cap cleft dipping pin and stripping ring, respectively;

Figures 11, 12:
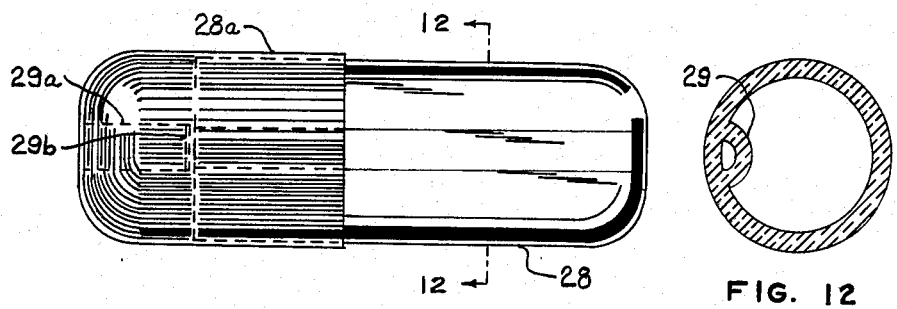
FIG. 11 is a component assembly view of the integrally formed multiple chamber capsule.
FIG. 12 is a transverse cross section elevation of the integrally formed capsule body taken along the line 12—12 of FIG. 11.
Figure 13:
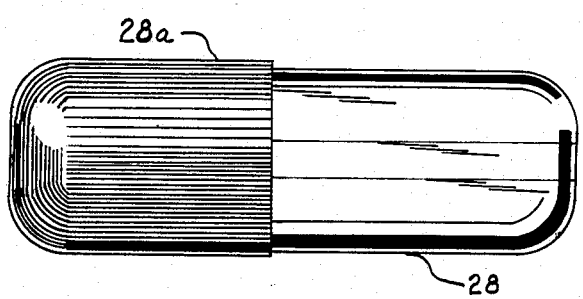
FIG. 13 is a perspective view of the assembled multiple chamber capsule.

FIGS. 16 and 17 respectively, are views of the elliptical dipping pin 20b with rotated section and stripping ring 22a, and dipping pin 20b rotated 90 degrees and stripping ring 22a.

DESCRIPTION

Referring to FIG. 1, the dipping tank 10 which may be conventional in form includes a dipping dish 11 surrounded by a reservoir 12 containing dipping solution 13 in a constant temperature jacket 14. Multiple chamber capsule dipping pins 20, 20a and 20b, mounted on bars 21, and stripping rings 22 and 22a, connected by slide rods 23 mounted on bars 24, are located, as illustrated, at successive work stations of the operation: at the base or loading station B of an elevator 30, at the unloading station C (dotted outline), and at a platform 40 which is the starting run D through a series of dryers to stripping station E. Mechanical finger means (not shown) are provided in connection with each dipping cycle for engaging and sliding the pin bar 21 and the slide rod mounting bar 24 set at A along parallel guide tracks 25 and 26 respectively into the loading station B of the elevator 30. The elevator 30 has a pair of vertical racks 31 which cooperate with a like pair of pinion gears 32 and discs 33. The two discs 33 each have two surface mounted grooved parallel retainer bars 34 and 35 and are spaced in the loading position illustrated, with the grooved retainer bars 34 and 35 in alignment with the top surfaces of the guide tracks 25 and 26 respectively, to receive the opposite ends of each advancing dipping pin bar 21 and slide rod mounting bar 24 in position for loading. Surrounding the elevator disc 33 is a flanged retainer ring 36 into which the surface mounted grooved retainer bar 35 is set, and which remains stationary with respect to the disc 33 and thus serves to retain the dipping pin bars 21 within the grooved retainer bar 34 as the disc 33 rotates while moving upwardly on the rack 31. Slide rod mounting bars 24 are retained and stabilized in place during the rotating disc 33 upward movement on the rack 31 by being positioned as aforesaid in disc 33 surface mounted grooved retainer bar groove 35 and being connected by slide rod bars 24 through holes in dipping pin bars 21 to stripping rings 22 and 22a. The gear and rack combination is arranged for movement of the elevator 30 to the upper terminal position C illustrated in dotted outline at 50 which the elevated pin bars 21 and slide rod mounting bars 24 are in the dipping pin 20, 20a, and 20b up position for simultaneous transfer from the grooved retainer bar grooves 34 and 35 respectively to the platform 40. In accordance with a preferred embodiment of my invention shown in FIGS. 1 and 2, a multiple chamber cleft dipping pin 20 and 20a and stripping ring 22 and 22a respectively, connected by slide rods 23 through holes in dipping pin mounting bar 21, are provided, and surface mounted parallel grooved retainer bars 34 and 35 are provided on disc 33. The slide rods 23 are dependently connected through holes in dipping bar 21, at opposite ends of the slide rods 23 between slide rod mounting bar 24 and stripping ring 22 and 22a.

The embodiment shown in FIGS. 1 and 2 features multiple chamber cleft diping pins 20 and 20a having interior wall forming clefts 27 and 27a with longitudinal axes parallel to the longitudinal axes of the cleft dipping pins 20 and 20a. The interior opposing surfaces within the clefts 27 and 27a of the cleft dipping pin 20 and 20a, when the pin is dipped into the dipping solution 13, also are film coated and the cleft is filled in the dipping process, thereby forming an interior wall 29 and 29a, to provide, when dried, a separate chamber integrally molded into the multiple chamber capsule body part 28 or cap part 28a. The open end section of the interior chamber wall 29 is formed at a suitable radius to provide a retainer flap 29b folded at a right angle to meet the inner surface of the exterior wall of the capsule cap part 28a, prior to closure of the filled multiple chamber capsule, as shown in FIG. 11. Upon subsequent opening or reopening of the multiple chamber capsule after its filling and closure, the retainer flap 29b is displaced from a right angle position by the resultant negative pressure of separation of the capsule body and cap parts and as a result of its displacement and withdrawal, the retention or stoppering effect of the flap is removed from the substance contained within the corresponding separate body chamber; thereafter, when the capsule is positioned for emptying, the positive force of gravity effects the release of all or a portion of the contained substance, thus creating an externally visible change in the appearance of the capsule, through the clear, transparent, or translucent exterior wall, through the apparent disturbance of the distinctive contrasting "tell-tale" substance within the separate chamber or by its partial or total absence therefrom. To provide a means of alignment of the counterpart chambers of body part 28 and cap part 28a of the capsule for closure, the cleft dipping pins 20 and 20a and the capsule parts 28 and 28a which, respectively, are molded thereby, are similarly elliptical in the same ratio, e.g., 1:1.035 in transverse cross section.

Figures 14, 15:
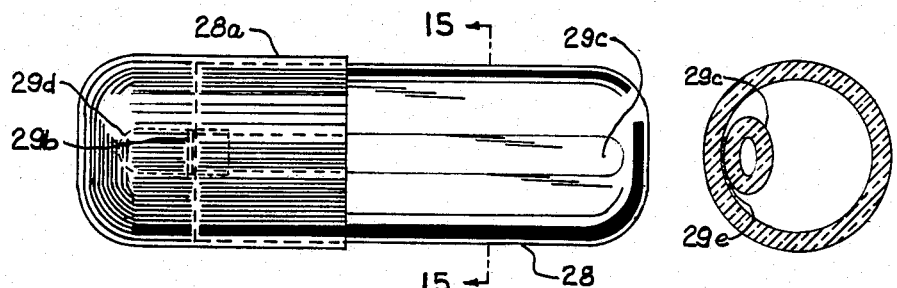
FIG. 14 is a component assembly view of the multiple chamber capsule formed by combining a capsule with a capsule fixed therein.
FIG. 15 is a transverse cross section elevation of the multiple chamber capsule formed by combining a capsule with a capsule fixed therein, taken along the line 15—15 of FIG. 14.

Another preferred embodiment of my invention shown in FIGS. 14 and 15 features a multiple chamber capsule consisting of at least two separate hard capsules of different sizes and capacities, made of methylcellulose, gel, or otherwise suitable solution, which are combined by placing, aligning, and fixing body and cap parts of the smaller hard capsules within the counterpart body and cap parts of the larger, outer hard capsule. To provide a means of alignmnent of the counterpart body parts and cap parts of the combined larger, outer and smaller, inner capsules for closure, the dipping pin 20b and the capsule parts which are molded thereby are elliptical in a convenient ratio, e.g., 1:1.035 in transverse cross section FIG. 15. To provide a means of fixing the counterpart body and cap parts of the larger, outer and smaller, inner capsules in place, respectively, in relation to each other, segments of the outer surfaces of both parts of the aligned smaller, inner capsules are bonded to contiguous segments of the inner surfaces of the analogous two parts of the larger, outer capsule thus forming into a single unit vehicle a fixed capsule within a capsule. The surface bonding 29e is accomplished, e.g., by means of linear thermal fusion, spot welding, laser fusion, or surface application of a gelatinous-based, collagen-based, or any other suitably derived and composited chemical bonding agent.

OPERATION

In a typical operation, the multiple chamber cleft dipping pins 20 and 20a, with encircling stripping rings 22 and 22a and slide rods 23 in pin down position as at station A in FIG. 1 are dipped in methylcellulose, gel, or other suitable dipping solution 13, withdrawn, exposed to air flow, and transferred to loading station B, rotated during elevation, transferred in pin up position to the dryer run starting at station D, transferred to the stripping station E with stripping rings 22 and 22a in pin up position, stripped by means of downward movement of dipping pin mounting bar 21, and greased (in preparation for the next cycle). For dipping, the solution 13, which may be a methylcellulose or gel solution, is maintained at a suitable temperature. The cleft pins are dipped a convenient number of bars at a time. The time required for dipping, loading, elevation during rotation, and transfer to the drying platform 40 is approximately 15 seconds. Transfer to the elevator 30 (position A to position B) requires less than one second, following which the pin mounting bar 21 sets and counterpart stripping ring mounting bar 24 sets come to a dead stop. The air flow exposure conveniently is continuous so that the coated cleft dipping pins are exposed to the same during the transfer to position B and during the dead stop and elevation. Substantially all of the film-stabilizing effect takes place during the transfer and dead stop. Thereafter the elevator is activated in conventional manner and the loaded pin bar sets are rotated to the terminal position C adjacent to the dryer platform 40. While being elevated the cleft dipping pins are rotated (standard rotation is two and one-half times) from the pin down position to the pin up position illustrated in dotted outline. Following a short dwell time, the cleft pin sets are transferred to the dryer platform 40 and are then processed through the dryer cycle in conventional fashion in pin up position until transfer to the stripping station E; the cleft pins are stripped by means of the stripping ring which remains stationary at the end of slide rods 23 as the dipping pin mounting bars 21 are lowered on slide rods 23 from their position immediately below the stripping ring 22 and 22a to slide rod bars 24, thereby stripping the dried pin film coating from the dipping pins. The dipping pin and stripping sets then are greased in preparation for the next cycle. To provide the necessary small increase in overall volume capacity of the multiple chamber capsule, the longitudinal dimension, when closed, of the standard, conventional, single chamber, two-piece hard body and cap type capsule is increased at an appropriate ratio, of 1:1.106, for example, or combined equivalent increases in length and diameter are provided in an equivalent volume configuration of the multiple chamber capsule.

While the above description contains many specifities, these should not be construed as limitations on the scope of the invention, but rather as an exemplification of two preferred embodiments thereof. Many other variations are possible, for example, an embodiment wherein the longitudinal axes of the configurations of the smaller, inner chambers may be other than parallel with the longitudinal axes of the larger, outer chamber; e.g., at a divergent angle, or broken, or curved. A further example of a variation of an embodiment of my invention is one in which the contrasting or other substance contained within the smaller, inner chamber is retained in place by means of a double male coupler of which an end is first inserted and fixed in the open end of the inner chamber of the cap part of the multiple chamber capsule, and, after filling and before closure, the opposite end is inserted, but not fixed, in the open end of the inner chamber of the body part of the multiple chamber capsule.

As hereinafter used, "pins" means male mold members for dip-forming capsules of the type used for containing medicaments, each of said members having a generally circular or generally elliptical unitary transverse cross-section outline generally defining the entire member throughout its length and having an axially extending cleft transversely through the member.

I claim:

1. A multiple chamber hard capsule making apparatus, comprising cleft dipping pins connected to mounting bars, and stripping rings connected by slide rods to said mounting bars for ejecting capsules from said pins.

2. Apparatus according to claim 1 having two types of cleft dipping pins, one type being shorter than the other, the shorter pin being sized for a capsule cap part; the other pin being sized for a capsule body part.

3. Apparatus of claim 1 wherein said stripping rings are connected by slide rods to said mounting bars.

4. Apparatus according to claim 1 having a parallel grooved rotation disc for receiving the cleft dipping pin mounting bars and stripping ring mounting bars, said mounting bars being retained in position for and during rotation.

5. Apparatus according to claim 1 wherein the stripping rings, slide rods, and slide rod mounting bar are activatable by inversion and release of said dipping pin mounting bar, and being further activatable by lowering of said dipping pin mounting bar toward said slide rod mounting bar in pin up position.

6. Apparatus according to claim 1 having cleft dipping pins elliptical in transverse cross section, connected to mounting bars and mounted thereon, and elliptical stripping rings elliptical in transverse cross section, connected by slide rods to mounting bars and mounted thereon.

7. Apparatus for forming capsules by dipping, comprising plural pins, said pins being cleft in transverse cross section, mounted on bars, means for lowering and lifting said bars for dipping and removing said pins from a capsule forming solution.

* * * * *